(12) United States Patent
Wang

(10) Patent No.: US 12,216,956 B2
(45) Date of Patent: Feb. 4, 2025

(54) SPLICE SCREEN DRIVING METHOD AND DRIVING DEVICE THEREOF, ELECTRONIC DEVICE AND COMPUTER-READABLE MEDIUM

(71) Applicants: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

(72) Inventor: Qian Wang, Guangdong (CN)

(73) Assignees: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/622,810

(22) PCT Filed: Dec. 20, 2021

(86) PCT No.: PCT/CN2021/139496
§ 371 (c)(1),
(2) Date: Dec. 25, 2021

(87) PCT Pub. No.: WO2023/108667
PCT Pub. Date: Jun. 22, 2023

(65) Prior Publication Data
US 2024/0028287 A1 Jan. 25, 2024

(30) Foreign Application Priority Data
Dec. 13, 2021 (CN) .......................... 202111514439.2

(51) Int. Cl.
*G06F 3/14* (2006.01)
*G06T 3/4007* (2024.01)
(Continued)

(52) U.S. Cl.
CPC .......... *G06F 3/1446* (2013.01); *G06T 3/4007* (2013.01); *G06T 5/73* (2024.01); *H04N 7/0117* (2013.01)

(58) Field of Classification Search
CPC ..... G06F 3/1446; G06T 3/4007; G06T 5/003; G06T 5/73; G06T 3/403; H04N 7/0117; (Continued)

(56) References Cited

U.S. PATENT DOCUMENTS 6,115,092 A * 9/2000 Greene .................... G09G 3/20
345/903
9,424,809 B1 * 8/2016 Jepsen .................. G03B 21/56
(Continued)

FOREIGN PATENT DOCUMENTS

CN 102737614 A 10/2012
CN 103514583 A 1/2014
(Continued)

OTHER PUBLICATIONS

International Search Report in International application No. PCT/CN2021/139496, mailed on Aug. 31, 2021.
(Continued)

*Primary Examiner* — Richard J Hong
(74) *Attorney, Agent, or Firm* — PV IP PC; Wei Te Chung

(57) ABSTRACT

A splice screen driving method, a splice screen driving device, an electronic device, and computer-readable medium are provided. According to a size of a filling screen in a splice screen, an initial video signal is expanded to obtain a first video signal that drives the filling screen. The second
(Continued)

video signal corresponding to the filling screen in the first video signal is sharpened and filtered to improve a clarity of a picture at a connection of a sub-display and the filling screen, to solve a problem of picture blur.

15 Claims, 3 Drawing Sheets

(51) Int. Cl.
    *G06T 5/73*     (2024.01)
    *H04N 7/01*     (2006.01)

(58) Field of Classification Search
    CPC .... H04N 23/60; H04N 19/176; G09F 9/3026;
              G09F 9/33; G09G 5/391; G09G 3/20;
              G09G 5/14; G09G 3/002; G03B 21/56
    See application file for complete search history.

(56) References Cited

U.S. PATENT DOCUMENTS

| | | | | |
|---|---|---|---|---|
| 2004/0252884 A1* | 12/2004 | Foote | ............... | H04N 23/60 |
| | | | | 348/E9.037 |
| 2008/0018506 A1* | 1/2008 | Raveendran | ......... | H04N 19/176 |
| | | | | 375/E7.181 |
| 2009/0147004 A1* | 6/2009 | Ramon | ............... | G09G 5/14 |
| | | | | 345/428 |
| 2009/0207195 A1* | 8/2009 | Chin | ............... | G09G 5/391 |
| | | | | 345/699 |
| 2011/0102300 A1* | 5/2011 | Wood | ............... | G09F 9/3026 |
| | | | | 345/1.3 |
| 2014/0010472 A1* | 1/2014 | Xu | ............... | G06T 5/73 |
| | | | | 382/263 |
| 2014/0168283 A1* | 6/2014 | Ouchi | ............... | G09G 3/002 |
| | | | | 345/690 |
| 2015/0022424 A1* | 1/2015 | Jepsen | ............... | G09F 9/3026 |
| | | | | 345/1.3 |
| 2017/0249119 A1* | 8/2017 | Ding | ............... | G09F 9/33 |
| 2020/0211155 A1* | 7/2020 | Ma | ............... | G06T 3/403 |

FOREIGN PATENT DOCUMENTS

| | | |
|---|---|---|
| CN | 206236060 U | 6/2017 |
| CN | 109920360 A | 6/2019 |
| CN | 110716703 A | 1/2020 |
| CN | 111260654 A | 6/2020 |

OTHER PUBLICATIONS

Written Opinion of the International Search Authority in International application No. PCT/CN2021/139496, mailed on Aug. 31, 2021.

Chinese Office Action issued in corresponding Chinese Patent Application No. 202111514439.2 dated Mar. 25, 2023, pp. 1-8.

* cited by examiner

SPLICE SCREEN DRIVING METHOD AND DRIVING DEVICE THEREOF, ELECTRONIC DEVICE AND COMPUTER-READABLE MEDIUM

FIELD OF INVENTION

The present application relates to display technologies, and more particularly, to a splice screen driving method, a splice screen driving device, an electronic device, and a computer-readable medium.

BACKGROUND OF INVENTION

Splice screens have been widely used in recent years. Splice screens usually include a plurality of display screens, and different display screens display different pictures. The pictures displayed on the plurality of display screens can be spliced to form a completed picture.

Since the splice screen is composed of the plurality of different display screens, and each display screen displays different pictures, this causes an edge part of each splice screen, especially a picture corresponding to a part connected with other splice screens, to appear blur, misalignment and other phenomena, which will affect a display of the picture.

SUMMARY OF INVENTION

The present application intends to provide a splice screen driving method, a splice screen driving device, an electronic device, and a computer-readable medium, to solve a problem of blurry and misalignment of the splice screen in the prior art.

In a first aspect, one embodiment of the present application provides a splice screen driving method, wherein a splice screen includes a plurality of sub-display screens and at least one filling screen, and wherein the plurality of sub-display screens are disposed at intervals by the at least one filling screen, and wherein the splice screen driving method includes:
    acquiring an initial video signal for driving the splice screen, and adjusting a resolution of the initial video signal according to the at least one filling screen to obtain a first video signal;
    determining a second video signal corresponding to the at least one filling screen in the first video signal;
    performing sharpening filtering on the second video signal to obtain a third video signal; and
    replacing the second video signal with the third video signal to obtain a target video signal, and wherein the target video signal is used to drive the splice screen.

In the splice screen driving method provided by the embodiments of the present application, according to a size of the filling screen in the splice screen, the initial video signal is first expanded to obtain the first video signal that can drive the filling screen. At the same time, sharpening filtering is performed on the second video signal corresponding to the filling screen in the first video signal to improve a picture definition at the connection between the filling screen and the sub-display screen, to solve a problem of picture blurring at a splicing place in the prior art.

In one possible embodiment, the step of acquiring an initial video signal for driving the splice screen, and adjusting a resolution of the initial video signal according to the at least one filling screen to obtain a first video signal includes:
    acquiring an initial video signal, and processing the initial video signal by linear interpolation to obtain a second video signal corresponding to the filling screen;
    wherein the first video signal includes the second video signal and the initial video signal.

In this embodiment, a method of adjusting the initial video signal is provided, by processing the initial video signal by linear interpolation, the second video signal corresponding to the filling screen is obtained, so that the filling screen can be driven by the second video signal to display the screen.

In one possible embodiment, there are two sub-display screens, one filling screen, and wherein a corresponding size of the filling screen is m*b, and wherein the step of acquiring an initial video signal for driving the splice screen, and adjusting a resolution of the initial video signal according to the at least one filling screen to obtain a first video signal includes:
    acquiring an initial video signal, wherein a resolution corresponding to the initial video signal is 2a*b;
    adjusting the resolution of the initial video signal from 2a*b to (2a+m)*b according to the size m*b corresponding to the filling screen;
    wherein a resolution corresponding to the second video signal is m*b; wherein the first video signal (2a+m)*b includes the second video signal m*b and the initial video signal 2a*b.

This embodiment provides a specific embodiment for adjusting the initial video signal according to the filling screen. Specifically, according to the size m*b of the filling screen, the resolution of the initial video signal is adjusted from 2a*b to (2a+m)*b.

In one possible embodiment, there are two sub-display screens, and one filled screen, and wherein after the step of performing sharpening filtering on the second video signal to obtain a third video signal, the splice screen driving method further includes:
    determining a first sub-display screen region of the sub-display screen that is connected to the filling screen and is within a target range;
    determining a fourth video signal corresponding to the first sub-display screen region in the initial video signal; and
    performing sharpening filtering on the fourth video signal to obtain a fifth video signal.

In this embodiment, the video signal corresponding to the first sub-display screen region in the target range around the filling screen is sharpened and filtered, so that the picture of the first sub-display screen region in the target range around the filling screen is clearer.

In one possible embodiment, the step of determining the first sub-display region of the sub-display screen that is connected to the filling screen and is within the target range includes:
    determining a region connected to the filling screen and having a same size as the filling screen according to a size of the filling screen, wherein the region is the first-sub-display screen region.

In this embodiment, it is determined that the size of the first sub-display screen is the same as the size of the filling screen, thereby determining a picture that needs to be further sharpened and filtering, and improving an accuracy of the pictures around the filling screen.

In one possible embodiment, the step of replacing the second video signal with the third video signal to obtain a target video signal, and wherein the target video signal is used to drive the splice screen includes:

replacing the fourth video signal with the fifth video signal, and replacing the second video signal with the third video signal, to obtain the target video signal;

wherein the target video signal is used to drive the splice screen.

In this embodiment, the fifth video signal and the third video signal after sharpening and filtering are used to drive the splice screen, so that the sub-display screen and the filling screen in the splice screen display clearer pictures.

In one possible embodiment, there are a plurality of filling screens, and wherein the plurality of filling screens cross and overlap to form at least one intersection region, and wherein the plurality of filling screens intersect to form a plurality of accommodating spaces, and wherein the plurality of sub-display screens are respectively disposed in the plurality of accommodating spaces, and wherein the step of processing the initial video signal by linear interpolation to obtain a second video signal corresponding to the filling screen includes:

processing the initial video signal by linear interpolation to obtain a plurality of second sub-video signals corresponding to the plurality of filling screens; and combining part of the video signals corresponding to the at least one intersection region of the plurality of second sub-video signals to obtain the second video signal corresponding to the filling screen.

In this embodiment of the present application, since an acquired signal corresponding to the filled screen is a signal corresponding to an entire row or column of transistors, and there is a cross between the signals corresponding to the entire row and column of transistors. By merging overlapping parts of the video signal corresponding to the entire row and column of the filled screen, an influence of overlapping parts of the signal to the picture can be eliminated.

In one possible embodiment, the step of performing sharpening filtering on the second video signal to obtain the third video signal further includes:

processing the second video signal by using a preset sharpening filter algorithm to obtain the third video signal.

In this embodiment, the sharpening filter algorithm is used to process the second video signal, which can effectively improve an accuracy of the picture corresponding to the second video signal.

In one possible embodiment, the preset sharpening filter algorithm is:

$$g(x,y)=f(x,y)-C*\nabla^2 f(x,y)$$

wherein the g(x,y) is the third video signal, the f(x,y) is the second video signal, and the $\nabla^2 f(x,y)$ is a preset Laplace operator, and the C is a preset sharpening filter coefficient.

In one possible embodiment, the preset sharpening filter algorithm is:

$$g(x,y)=f(x,y)-C*\nabla^2 f(x,y)$$

wherein the g(x,y) is the third video signal, the f(x,y) is the second video signal, the $\nabla^2 f(x,y)$ is a preset Laplace operator, and the C is a preset sharpening filter coefficient.

This embodiment provides a specific algorithm for sharpening and filtering. The foregoing algorithm can be used to sharp the second video signal to obtain a third video signal with higher precision after sharpening and filtering.

In a second aspect, one embodiment of the present application provides a splice screen driving device, wherein a splice screen includes a plurality of sub-display screens and at least one filling screen, and wherein the plurality of sub-display screens are disposed at intervals by the at least one filling screen, and wherein the splice screen driving device includes:

an acquiring module configured to acquire an initial video signal for driving the splice screen, and adjusting a resolution of the initial video signal according to the at least one filling screen to obtain a first video signal;

a determining module configured to determine a second video signal corresponding to the at least one filling screen in the first video signal;

a sharpening filtering module configured to perform sharpening filtering on the second video signal to obtain a third video signal; and a driving module configured to replace the second video signal with the third video signal to obtain a target video signal, and wherein the target video signal is used to drive the splice screen.

In one possible embodiment, the acquisition module is configured to acquire an initial video signal, and configured to process the initial video signal by linear interpolation to obtain a second video signal corresponding to the filling screen;

wherein the first video signal includes the second video signal and the initial video signal.

In this embodiment, a method of adjusting the initial video signal is provided, by processing the initial video signal by linear interpolation, the second video signal corresponding to the filling screen is obtained, so that the filling screen can be driven by the second video signal to display the screen.

In one possible embodiment, there are two sub-display screens, one filling screen, and wherein a corresponding size of the filling screen is m*b, and wherein the acquisition module is configured to acquire an initial video signal, wherein a resolution corresponding to the initial video signal is 2a*b; and wherein the acquisition module is configured to adjust the resolution of the initial video signal from 2a*b to (2a+m)*b according to the size m*b corresponding to the filling screen; and wherein a resolution corresponding to the second video signal is m*b; wherein the first video signal (2a+m)*b includes the second video signal m*b and the initial video signal 2a*b.

This embodiment provides a specific embodiment for adjusting the initial video signal according to the filling screen. Specifically, according to the size m*b of the filling screen, the resolution of the initial video signal is adjusted from 2a*b to (2a+m)*b.

In one possible embodiment, there are two sub-display screens, and one filled screen; the sharpening filter module is configured to determine a first sub-display screen region of the sub-display screen that is connected to the filling screen and is within a target range, configured to determine a fourth video signal corresponding to the first sub-display screen region in the initial video signal, and configured to perform sharpening filtering on the fourth video signal to obtain a fifth video signal.

In this embodiment, the video signal corresponding to the first sub-display screen region in the target range around the filling screen is sharpened and filtered, so that the picture of the first sub-display screen region in the target range around the filling screen is clearer.

In one possible embodiment, the sharpening filter module is configured to determine a region connected to the filling screen and having a same size as the filling screen according to a size of the filling screen, wherein the region is the first-sub-display screen region.

In this embodiment, it is determined that the size of the first sub-display screen is the same as the size of the filling screen, thereby determining a picture that needs to be further sharpened and filtering, and improving an accuracy of the pictures around the filling screen.

In one possible embodiment, the driving module is configured to replace the fourth video signal with the fifth video signal, and replacing the second video signal with the third video signal, to obtain the target video signal, and configured to drive the splice screen by the target video signal.

In this embodiment, the fifth video signal and the third video signal after sharpening and filtering are used to drive the splice screen, so that the sub-display screen and the filling screen in the splice screen display clearer pictures.

In one possible embodiment, there are a plurality of filling screens, and wherein the plurality of filling screens cross and overlap to form at least one intersection region, and wherein the plurality of filling screens intersect to form a plurality of accommodating spaces, and wherein the plurality of sub-display screens are respectively disposed in the plurality of accommodating spaces; and wherein the sharpening filter module is configured to process the initial video signal by linear interpolation to obtain a plurality of second sub-video signals corresponding to the plurality of filling screens, and wherein the sharpening filter module is configured to combine part of the video signals corresponding to the at least one intersection region of the plurality of second sub-video signals to obtain the second video signal corresponding to the filling screen.

In this embodiment of the present application, since an acquired signal corresponding to the filled screen is a signal corresponding to an entire row or column of transistors, and there is a cross between the signals corresponding to the entire row and column of transistors. By merging overlapping parts of the video signal corresponding to the entire row and column of the filled screen, an influence of overlapping parts of the signal to the picture can be eliminated.

In one possible embodiment, the sharpening filter module is configured to process the second video signal by using a preset sharpening filter algorithm to obtain the third video signal.

In this embodiment, the sharpening filter algorithm is used to process the second video signal, which can effectively improve an accuracy of the picture corresponding to the second video signal.

In one possible embodiment, the preset sharpening filter algorithm is:

$$g(x,y)=f(x,y)-C*\nabla^2 f(x,y)$$

wherein the g(x,y) is the third video signal, the f(x,y) is the second video signal, the $\nabla^2 f(x,y)$ is a preset Lap Lass operator, and the C is a preset sharpening filter coefficient.

This embodiment provides a specific algorithm for sharpening and filtering. The foregoing algorithm can be used to sharp the second video signal to obtain a third video signal with higher precision after sharpening and filtering.

In a third aspect, one embodiment of the present application also provides an electronic device, including:
one or a plurality of processors;
a memory; and
one or a plurality of application programs, wherein the one or the plurality of application programs are stored in the memory and configured to be executed by the processor to implement the splice screen driving method according to any one of the above embodiments.

In a fourth aspect, one embodiment of the present application also provides a computer-readable storage, wherein a computer program is stored thereon, and the computer program is loaded by a processor to execute the steps in the splice screen driving method according to any one of the splice screen driving methods described above.

In the splice screen driving method, the device, the server, and the storage medium provided by the embodiments of the present application, according to a size of the filling screen in the splice screen, the initial video signal is first expanded to obtain the first video signal that can drive the filling screen. At the same time, sharpening filtering is performed on the second video signal corresponding to the filling screen in the first video signal to improve a picture definition at the connection between the filling screen and the sub-display screen, to solve a problem of picture blurring at a splicing place in the prior art.

DESCRIPTION OF FIGURES

In order to explain the technical solutions in the embodiments of the present application more clearly, the following will briefly introduce the figures needed in the description of the embodiments. Obviously, the figures in the following description are only some embodiments of the present application. For those skilled in the art, without inventive steps, other figures can be obtained based on these figures.

DETAILED DESCRIPTION OF EMBODIMENTS

Figure 1:
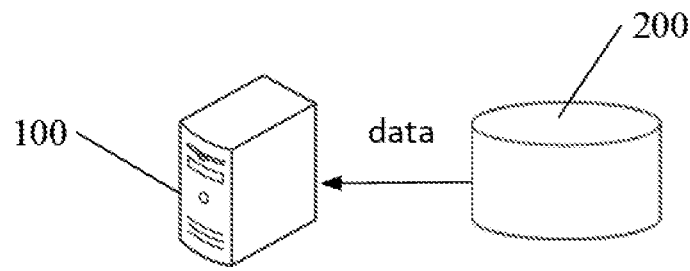
FIG. 1 is a schematic diagram of a scene of a splice screen driving system provided by one embodiment of the present application.

The technical solutions in the embodiments of the present application will be clearly and completely described below in conjunction with the figures in the embodiments of the present application. Obviously, the described embodiments are only a part of the embodiments of the present application, rather than all the embodiments. Based on the embodiments in the present application, all other embodiments obtained by those skilled in the art without inventive steps fall within a protection scope of the present application.

In the description of the present application, it needs to be understood that the terms "center", "longitudinal", "transverse", "length", "width", "thickness", "upper", "lower", "front", "rear", "left", "right", "vertical", "horizontal", "top", "bottom", "inner", and "outer" are orientation or positional based on the orientation shown in the figures. The positional relationship is only for the convenience of describing the application and simplifying the description, rather than indicating or implying that the device or element referred to must have a specific orientation, be constructed and operated in a specific orientation. Therefore, it cannot be construed as a limitation of the present application. In addition, the terms "first" and "second" are only used for descriptive purposes, and cannot be understood as indicating or implying relative importance or implicitly indicating the number of indicated technical features. Thus, the features defined with "first" and "second" may explicitly or implicitly include one or more features. In the description of the present application, "a plurality of" means two or more than two, unless otherwise specifically defined.

In the present application, the word "exemplary" is used to mean "serving as an example, illustration, or illustration.". Any embodiment described as "exemplary" in the present application is not necessarily construed as being more preferred or advantageous over other embodiments. In order to enable any person skilled in the art to implement and use the present application, the following description are provided. In the following description, the details are listed for the purpose of explanation. It should be understood that those of ordinary skill in the art can realize that the present application can also be implemented without using these specific details. In other instances, the well-known structure and process will not be described in detail to avoid unnecessary details to obscure the description of the present application. Therefore, the present application is not intended to be limited to the illustrated embodiments, but is consistent with the widest scope that conforms to the principles and features disclosed in the present application.

It should be noted that, since the methods in the embodiments of the present application are executed in electronic devices, the processing objects of each electronic device exist in the form of data or information, such as time data, which is essentially time information. It is understandable that the size, quantity, position, etc. mentioned in the subsequent embodiments are all corresponding data to be processed by the electronic device, and the details are not repeated here.

The embodiments of the present application provide a splice screen driving method, a splice screen driving device, an electronic device, and a computer-readable medium, which will be described in detail below.

Please refer to FIG. 1, which is a schematic diagram of a scene of a splice screen driving system provided by one embodiment of the present application. The splice screen driving system may include an electronic device 100, wherein the electronic device 100 is integrated with a splice screen driving device, as an electronic device shown in FIG. 1.

In the embodiments of the present application, the electronic device 100 may be an independent server, or may be a server network or server cluster composed of servers. For example, the electronic device 100 described in the embodiment of the present application includes, but is not limited to, a computer, a network host, a single web server, a plurality of web servers, or a cloud server composed of a plurality of servers. The cloud server is composed of a large number of computers or network servers based on cloud computing.

Those skilled in the art can understand that the application environment shown in FIG. 1 is only an application scenario of a solution of the present application, and does not constitute a limitation on the application scenario of the solution of the present application. Other application environments may also include more or less electronic devices, for example, only one electronic device is shown in FIG. 1. It is understandable that the splice screen driving system may also include one or more other servers, which are not specifically limited here.

In addition, as shown in FIG. 1, the splice screen driving system may further include a memory 200 for storing data.

It should be noted that the scene schematic diagram of the splice screen driving system shown in FIG. 1 is only an example, and the splice screen driving system and scene described in the embodiments of the present application are intended to explain the technical solutions of the embodiments of the present application more clearly, and are not constituted a limitation on the technical solutions provided by the embodiments of the present application. Those of ordinary skill in the art will know that with the evolution of splice screen drive systems and an emergence of new business scenarios, the technical solutions provided by the embodiments of the present application are equally applicable to similar technical problems.

First, one embodiment of the present application provides a splice screen driving method, an execution subject of the splice screen driving method is a splice screen driving device, the splice screen driving device is applied to an electronic device, and the splice screen driving method includes: acquiring an initial video signal for driving the splice screen, and adjusting a resolution of the initial video signal according to the at least one filling screen to obtain a first video signal; determining a second video signal corresponding to the at least one filling screen in the first video signal; performing sharpening filtering on the second video signal to obtain a third video signal; and replacing the second video signal with the third video signal to obtain a target video signal, and wherein the target video signal is used to drive the splice screen.

Figure 2:
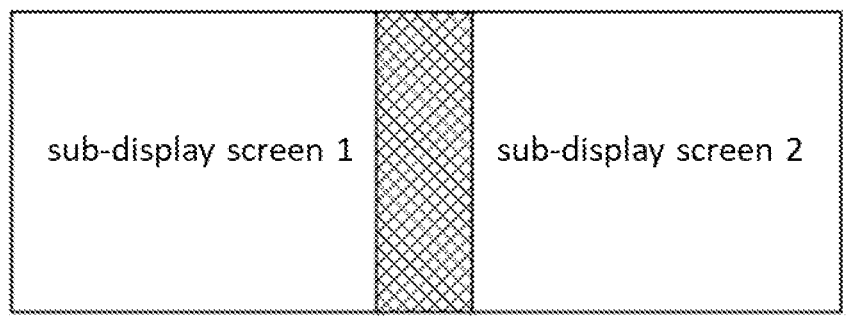
FIG. 2 is a schematic structural diagram of one embodiment of a splice screen provided by one embodiment of the present application.

As shown in FIG. 2, it is a schematic structural diagram of the splice screen provided by one embodiment of this application. In FIG. 2, the splice screen includes a plurality of sub-display screens such as a sub-display screen 1 and a sub-display screen 2. A filling screen is disposed between the sub-display screen 1 and the sub-display screen 2, and wherein the sub-display screen 1 and sub-display screen 2 are separated disposed by the filling screen.

Figure 3:
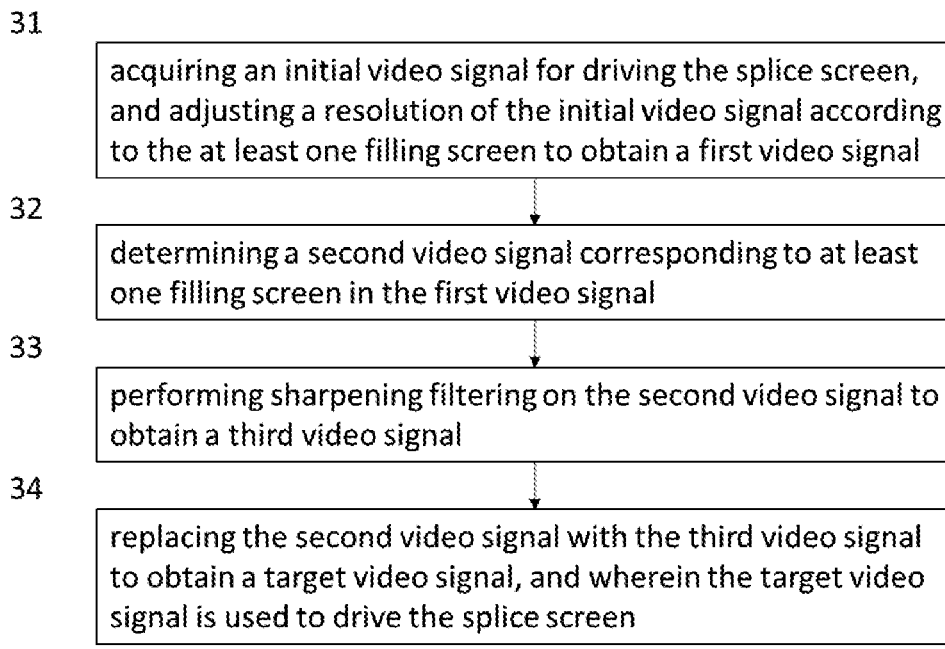
FIG. 3 is a schematic flowchart of one embodiment of the splice screen driving method provided by one embodiment of the present application.

As shown in FIG. 3, FIG. 3 is a schematic flowchart of one embodiment of the splice screen driving method provided by one embodiment of this application, which may include:

31: acquiring an initial video signal for driving the splice screen, and adjusting a resolution of the initial video signal according to the at least one filling screen to obtain a first video signal.

In this embodiment of the present application, the filling screens are arranged between a plurality of sub-display screens, and in order to ensure a completeness of the screen, the filling screens also need to display the screen. In this way, the screen displayed on the filling screens are spliced with the screen displayed on the sub-display screens, to form a complete picture.

Normally, an initial video signal received by the splice screen only matches the sub-display screen, and can only be displayed on the corresponding pixels of the sub-display screen. If the picture is intend to be displayed on the filled screen, a resolution of the initial video signal also need to be adjusted to make the adjusted resolution picture can be displayed on the sub-display screen and the filling screen.

32: determining a second video signal corresponding to at least one filling screen in the first video signal.

After adjusting the resolution of the initial video signal to obtain the first video signal, the second video signal corresponding to the filling screen in the first video signal can be determined. The second video signal is the video signal that needs to be displayed on the filling screen.

33: performing sharpening filtering on the second video signal to obtain a third video signal.

34. replacing the second video signal with the third video signal to obtain a target video signal, and wherein the target video signal is used to drive the splice screen.

After the second video signal to be displayed on the filling screen is determined, the picture displayed on the filling screen needs to be spliced and merged with the picture displayed on the sub-display screen to obtain a complete picture. However, the merged screen will have problems such as misalignment and blurring at a junction position of the sub-display screen and the filling screen.

In the embodiment of the present application, sharpening filtering can be performed on the second video signal, and the sharpening filtering can effectively extract detailed information in the picture and improve a problem of blurred edges of the picture. That is, the second video signal can be sharpened and filtered, so that the details of the picture displayed on the filling screen are more prominent, and the edges of the picture are clearer.

According to the splice screen driving method provided in the embodiments of the present application, according to a size of the filling screen in the splice screen, the initial video signal is first expanded to obtain the first video signal that can drive the filling screen. At the same time, sharpening filtering is performed on the second video signal corresponding to the filling screen in the first video signal, to improve a picture definition at a connection between the filling screen and the sub-display screen, and solve a picture blur problem in the prior art.

In some embodiments of the present application, the step of acquiring the initial video signal and adjusting the resolution of the initial video signal according to the filling screen to obtain the first video signal may include:

acquiring an initial video signal, and processing the initial video signal by linear interpolation to obtain a second video signal corresponding to the filling screen;

wherein the first video signal includes the second video signal and the initial video signal Specifically, in the embodiments of the present application, the initial video signal (that is, the picture that needs to be displayed on the sub-display screen) can be zoomed, so that the zoomed video signal can be displayed on the sub-display screen and the filling screen at the same time.

In some embodiments, linear interpolation can be used to scale the initial video signal process to determine the second video signal that needs to be displayed on the filling screen; while the second video signal is displayed in the filling screen, the initial video signal is still displayed in the sub display normally. The first video signal at this time includes the second video signal and the initial video signal.

In the foregoing embodiment, it is necessary to process the initial video signal by linear interpolation according to the size corresponding to the filling screen to obtain the second video signal. This is because the size corresponding to the filling screen actually represents a number of pixels that need to be displayed on the filling screen and a specific arrangement of the plurality of pixels. Therefore, it is necessary to determine the second video signal corresponding to the filling screen according to the size corresponding to the filling screen.

Please refer to FIG. 2. In the embodiment shown in FIG. 2, the resolution corresponding to the initial video signal can be 2a*b, because the filling screen is disposed between the two sub-display screens, and a corresponding size of the filling screen is m*b. At this time, the resolution of the initial video signal can be adjusted from 2a*b to (2a+m)*b.

In some embodiments of the present application, after the second video signal displayed on the fill screen is determined, the second video signal needs to be sharpened and filtered to enhance the detailed information in the picture and eliminate a problem of picture blurring at the edge of the picture.

On a basis of the above-mentioned embodiment, not only can the pictures displayed on the filling screen be sharpened and filtered, but also the pictures displayed on part of the sub-display screens connected to the filling screen can be sharpened and filtered, to further reduce the problem of blurring of the picture at the junction of the sub-display screen and the filling screen.

Please refer to FIG. 2. In FIG. 2, there are two sub-display screens and one filling screen. The filling screen is disposed between the two sub-display screens. At this time, the second video signal is sharpened and filtered, after the third video signal is obtained, some of the pictures displayed on the sub-display screens can also be sharpened and filtered. It is mainly to sharpen and filter the part of the pictures in the sub-display screen which contact with the filling screen.

Specifically, the first sub-display region of the sub-display screen region connected to the sub-display screen and within the target range in the sub-display screen can be determined. A fourth video signal corresponding to the first sub-display screen region in the initial video signal can be determined. The fourth video signal is sharpened and filtered to obtain a fifth video signal.

Specifically, please refer to FIG. 2, both the two sub-display screens in the figure include a side in contact with the filling screen. The picture displayed on the filling screen and the picture displayed on the sub-display screen are connected from the junction position of the sub-display screen and the filling screen. In this embodiment of the present application, not only the sharpening filtering is performed on the pictures on the filling screen, but also the sharpening filtering is performed on the pictures in the parts of the two sub-display screens in contact with the filling screen.

In other embodiments, the sharpening filtering process may be processed only on a part of the screen in contact with the filling screen on one sub-display. The sharpening filtering process may also be performed on the pictures in parts of the screens in contact with the filling screen on all the sub-display screens.

In the above-mentioned embodiments, it is only necessary to process sharpening filtering processing on the picture displayed in a part of the screen connected to the filling screen in the sub-display screen, and it is not necessary to process sharpening filtering processing on the entire picture displayed on the sub-display screen. Therefore, it is necessary to determine the first sub-display region that is connected to the filling screen of the sub-display screen and is within the target range.

In some embodiments, the area range corresponding to the first target sub-display screen may be a same as the area range corresponding to the filling screen. That is, sizes of the first target sub-display screen and the filling screen are the same. At this time, it is determined that the sub-display screen is connected to the filling screen and is in the first sub-display region of the target range, which can be:

according to the size of the filling screen, the region connected to the filling screen and the same size as the filling screen is determined in the sub-display screen, and this region is the first sub-display screen region.

Please refer to FIG. 2. Region 2 in FIG. 2 is the region corresponding to the filling screen, and region 1 is the first sub-display region connected to the filling screen on a sub-display and having the same size as the filling screen; and region 3 is the first sub-display region connected to the filling screen on another sub-display and the same size as the filling screen.

After the first sub-display region is determined, since the first sub-display region is still a part of the sub-display, a fourth video signal corresponding to the first sub-display region can be determined in the initial video signal, and the fourth video signal is subjected to sharpening filtering processing to obtain a fifth video signal.

At this time, the second video signal is replaced with the third video signal to obtain the target video signal, and the target video signal is used to drive the splice screen, which may include:

replacing the fourth video signal with the fifth video signal, and replacing the second video signal with the third video signal, to obtain the target video signal;

wherein the target video signal is used to drive the splice screen.

At this time, the filling screen in the splice screen displays the third video signal after sharpening and filtering, and the first sub-display region displays the fifth video signal after sharpening and filtering. A region of the sub-display screen except the first sub-display region outside the display region still display the original video signal.

Figure 4:
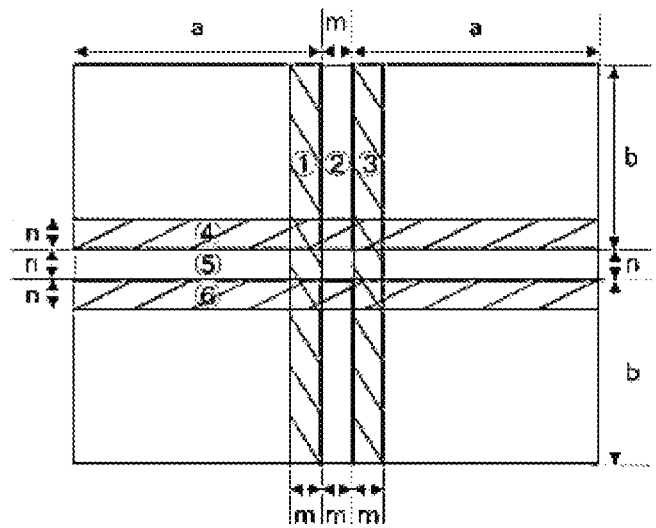
FIG. 4 is a schematic structural diagram of another embodiment of the splice screen provided by one embodiment of the present application.

As shown in FIG. 4, FIG. 4 is a schematic structural diagram of another embodiment of the splice screen provided by one embodiment of the present application. In the embodiment shown in FIG. 4, the splice screen includes a plurality of sub-display screens and a plurality of filling screens. The plurality of filling screens intersect to form a plurality of accommodating spaces, and wherein the plurality of sub-display screens are respectively disposed in the plurality of accommodating spaces. The plurality of filling screens are also overlapped to form at least one intersection region.

At this time, the step of processing the initial video signal by linear interpolation to obtain a second video signal corresponding to the filling screen includes: using linear interpolation to process the initial video signal to obtain a plurality of second sub-video signals corresponding to a plurality of filling screens. Combining part of the video signals corresponding to the at least one intersection region of the plurality of second sub-video signals to obtain the second video signal corresponding to the filling screen.

That is, because a plurality of filling screens overlapped and form an intersection region, and when the second sub video signal corresponding to each filling screen is obtained by the linear interpolation. For the intersection region, the corresponding video signal has been processed a plurality times, and the final picture displayed in the cross region is a superposition of the pictures corresponding to the plurality of filling screens here.

Similarly, for the splice screen shown in FIG. 4, the screens of the parts of the plurality of sub-display screens connected to the plurality of filling screens can also be sharpened and filtered, to make the picture transition at the junction of each filled screen and the sub-display screen more natural.

Please refer to FIG. 4. For FIG. 4, the splice screen includes four sub-display screens and two filling screens, and the two filling screens are overlapped and arranged to form an intersection region and four accommodating spaces. The four sub-display screens are separately disposed in the four accommodating spaces. The four sub-display screens are separated by two filling screens.

It should be noted that in an actual display panel, the plurality of filling screens are disposed between different sub-display screens to space the sub-display screens, and there is usually no overlapping region between the plurality of filling screens. The plurality of filling screens described in this embodiment of the present application overlap to form an intersection region, which actually means that the pictures corresponding to the plurality of filling screens form one intersection region. Specifically, since the filling screens and the sub-display screens are usually composed of pixel units disposed in an array of a plurality of rows and a plurality of columns, and when the display panel is driven by the video signal, a whole rows or a whole columns of pixel units are usually driven, Therefore, the processing of the video signal in the embodiment of the present application is to process the signal corresponding to a whole row or a whole column of pixel units. As shown in FIG. 4, when actually processing the video signal corresponding to the filling screen, the video signal corresponding to the entire row or column of pixel units is obtained, and when the video signal of the entire row and column is driven, there will be intersecting parts. In the embodiment of the present application, for the signal in the crossing region, signal superposition is directly performed, and two driving signals are used for driving twice.

In FIG. 4, the four sub-display screens may be sub-display screen A, sub-display screen B, sub-display screen C, and sub-display screen D, respectively. The sizes of the four sub-display screens are the same, and the resolutions of the four sub-display screens are also the same, all of which are a*b. The resolutions of the two filling screens are m*(2b+n) and n(2a+m). At this time, the resolution of the entire splice screen is (2a+m)*(2b+n).

A resolution of the initial video signal received by the splice screen is 2a*2b, but due to the existence of the filling screen, the picture must also be displayed on the filling screen. At this time, the resolution of the initial video signal needs to be adjusted according to the two filling screens. Specifically, the resolution of the initial video signal may be adjusted from 2a*2b to (2a+m)*(2b+n).

After adjusting the resolution of the initial video signal to obtain the first video signal, the second video signal corresponding to the filling screen can be determined in the first video signal. Since there are two filling screens, two second sub-video signals are obtained, namely: m*(2b+n) and n(2a+m). Since the two filling screens intersect to form a cross region, the two second sub-video signals cross in the cross region. In the embodiment of the present application, the two second sub video signals are superimposed on the pictures corresponding to the intersection region, and finally the picture displayed in the intersection region is obtained.

In the foregoing embodiment, it is also necessary to perform sharpening filtering on the second sub-video signals corresponding to the two filling screens to enhance the details in the corresponding pictures of the filling screen.

In the embodiment of the present application, in the step of performing sharpening filtering on the second video signal to obtain the third video signal further the second video signal is processed by using a preset sharpening filter algorithm to obtain the sharpening filter algorithm in the third video signal, wherein the preset sharpening filter algorithm is:

$$g(x,y)=f(x,y)-C*\nabla^2 f(x,y)$$

wherein the g(x,y) is the third video signal, the f(x,y) is the second video signal, the $\nabla^2$ f(x,y) is a preset Laplace operator, and the C is a preset sharpening filter coefficient.

The above-mentioned sharpening filtering algorithm represents: the third video signal obtained by sharpening filtering can remove a noise part and an error part that affect the picture in the second video signal, so that the picture is clearer and the contrast is improved.

$\nabla^2 f(x,y)$ is the preset Laplace operator, more specifically $$\nabla^2 f(x,y)=f(x+1,y)+f(x-1,y)+f(x,y+1)+f(x,y-1)-4f(x,y)$$

wherein x and y are the coordinates corresponding to the pixels, and (x+1, y), (x−1, y), f(x,y+1), f(x,y−1) are the plurality of pixels (x,y) respectively.

Figure 5:
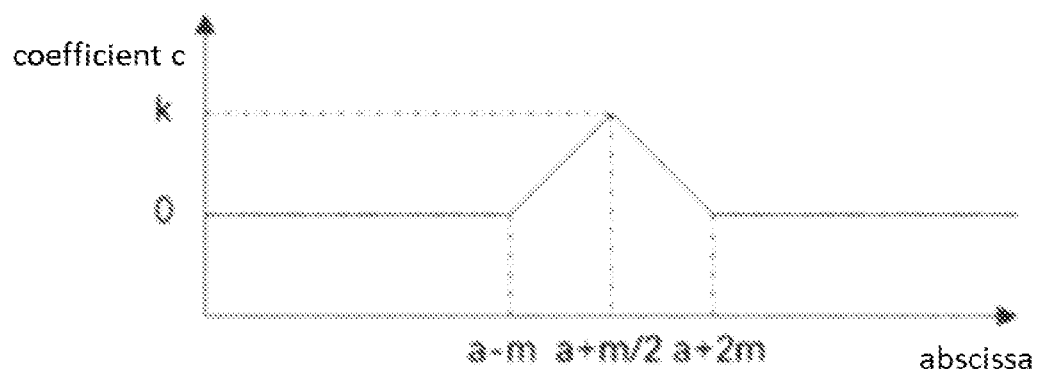
FIG. 5 is a schematic diagram of one embodiment of a mapping relationship between sharpening filter coefficients and pixel positions provided by one embodiment of the present application.

As shown in FIG. 5, FIG. 5 is a schematic diagram of one embodiment of a mapping relationship between sharpening filter coefficients and pixel positions provided by one embodiment of the present application. In the mapping relationship shown in FIG. 5, an abscissa is the pixel position, and an ordinate is a sharpening filter coefficient C.

It can be seen from FIG. 5 that the sharpening filter coefficient C is not directly proportional to the pixel position. When the selected pixel positions are different, the value of the sharpening filter coefficient C is also different. In some embodiments, the sharpening filter coefficient C may satisfy the following range:

$$C = \begin{cases} 0, x \le a-m \text{ or } x > a+2m \\ [x-(a-m)]*\dfrac{k}{\left(\dfrac{3m}{2}\right)}, a-m < x \le a+m/2 \\ -\left[x-\left(a+\dfrac{m}{2}\right)\right]*\dfrac{k}{\left(\dfrac{3m}{2}\right)}+k, a+m/2 < x \le a+2m \end{cases}$$

Please refer to FIG. 5, when x in the pixel position f(x,y) satisfies x≤a−m or x>a+2m, the sharpening filter coefficient C is 0. And when x satisfies a−m<x≤a+m/2, then the sharpening filter coefficient C is $$[x-(a-m)]*\dfrac{k}{\left(\dfrac{3m}{2}\right)}.$$

In the same way, when x satisfies a+m/2<x≤a+2m, at this time, the sharpening filter coefficient C is $$-\left[x-\left(a+\dfrac{m}{2}\right)\right]*\dfrac{k}{\left(\dfrac{3m}{2}\right)}+k.$$

It should be noted that the above-mentioned sharpening filter coefficient C is for the filled screen with a resolution of m*(2b+n) in FIG. 5. In the same way, for the filling screen with the resolution of n(2a+m) shown in FIG. 5, the sharpening filter coefficient can be:

$$C = \begin{cases} 0, y \le b-n \text{ or } x > b+2n \\ [y-(b-n)]*\dfrac{k}{\left(\dfrac{3n}{2}\right)}, b-n < y \le b+n/2 \\ -\left[y-\left(b+n/2\right)\right]*\dfrac{k}{\left(\dfrac{3n}{2}\right)}+k, b+n/2 < y \le b+2n \end{cases}$$

Similarly, when y in the pixel position f(x,y) satisfies y≤b−n or x>b+2n, the sharpening filter coefficient C is 0. And when x satisfies b−n<y≤b+n/2, then the sharpening filter coefficient C is $$[y-(b-n)]*\dfrac{k}{\left(\dfrac{3n}{2}\right)}.$$

In the same way, when x satisfies b+n/2<y≤b+2n, at this time, the sharpening filter coefficient C is $$-\left[y-\left(b+n/2\right)\right]*\dfrac{k}{\left(\dfrac{3n}{2}\right)}+k.$$

k is a parameter that can be debugged.

In the above-mentioned embodiment, not only can the two filling screens be sharpened and filtered, but also the picture transition of junction positions of the sub-display screens and the filling screens can be more natural, and there will be no dislocation.

In the embodiment shown in FIG. 5, the two filling screens correspond to display region 2 and display region 5 respectively; and the regions connected to the two filling screens in the four sub-display screens may be display region 1, display region 3, display region 4, and display region 6. The sharpening filter processing can be performed on the screens of the display region 1, the display region 3, the display region 4, and the display region 6, respectively.

Of course, in some embodiments, it is also possible to perform sharpening filtering processing only on the pictures in the display region 1 and the display region 4, or only performing sharpening filtering processing on the pictures in the display region 3 and the display region 6. That is, it is possible to process only the pictures in the display region connected to the filling screen in part of the sub-display screens, instead of processing the pictures in the display region connected to the filling screen in all the sub-display screens.

In the embodiment of the present application, for the display region 1, the display region 2, and the display region 3, the sharpening filter coefficient C corresponding to the sharpening filter processing of the three can satisfy a same sharpening filter parameter formula, specifically, it can be:

$$C = \begin{cases} 0, x \le a-m \text{ or } x > a+2m \\ [x-(a-m)]*\dfrac{k}{\left(\dfrac{3m}{2}\right)}, a-m < x \le a+m/2 \\ -\left[x-\left(a+\dfrac{m}{2}\right)\right]*\dfrac{k}{\left(\dfrac{3m}{2}\right)}+k, a+m/2 < x \le a+2m \end{cases}$$

Similarly, for display region 4, display region 5, and display region 6, the sharpening filter coefficient C corresponding to the three sharpening filtering processing can satisfy the same sharpening filter parameter formula; specifically, it can be:

$$C = \begin{cases} 0, & y \leq b-n \text{ or } x > b+2n \\ [y-(b-n)] * \dfrac{k}{\left(\dfrac{3n}{2}\right)}, & b-n < y \leq b+n/2 \\ -[y-(b+n/2)] * \dfrac{k}{\left(\dfrac{3n}{2}\right)} + k, & b+n/2 < y \leq b+2n \end{cases}$$

That is, in the embodiment of the present application, the sharpening filter coefficient corresponding to a part of the display region in the sub-display in contact with the filling screen may satisfy the same sharpening filter coefficient formula as the sharpening filter coefficient corresponding to the filling screen.

In the embodiments of the present application, the specific process of sharpening filtering can refer to the prior art, which is not limited here.

In other embodiments of the present application, there may be more than four sub-display regions, and there are also more than two corresponding filling screens. In this case, the splice screen driving method provided in the foregoing embodiment is also applicable.

Figure 6:
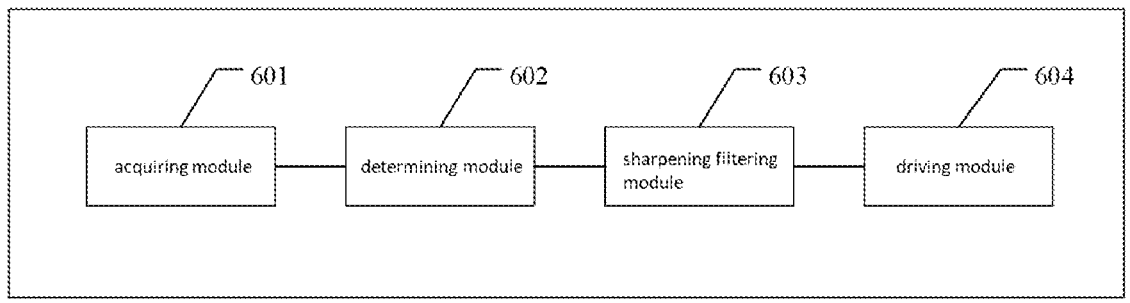
FIG. 6 is a schematic diagram of one embodiment of a splice screen driving device provided by one embodiment of the present application.

The embodiment of the present application also provides a splice screen driving device. As shown in FIG. 6, a schematic diagram of one embodiment of the splice screen driving device provided by the embodiment of the present application, the splice screen driving device may include:

an acquiring module 601 configured to acquire an initial video signal for driving the splice screen, and adjusting a resolution of the initial video signal according to the at least one filling screen to obtain a first video signal;

a determining module 602 configured to determine a second video signal corresponding to the at least one filling screen in the first video signal;

a sharpening filtering module 603 configured to perform sharpening filtering on the second video signal to obtain a third video signal; and a driving module 604 configured to replace the second video signal with the third video signal to obtain a target video signal, and wherein the target video signal is used to drive the splice screen.

According to the splice screen driving device provided by the embodiment of the present application, the device according to a size of the filling screen in the splice screen, the initial video signal is first expanded to obtain the first video signal that can drive the filling screen. At the same time, sharpening filtering is performed on the second video signal corresponding to the filling screen in the first video signal to improve a picture definition at the connection between the filling screen and the sub-display screen, to solve a problem of picture blurring at a splicing place in the prior art.

In some embodiments of the present application, the acquiring module 601 may be configured to acquire an initial video signal, and configured to process the initial video signal by linear interpolation to obtain a second video signal corresponding to the filling screen;

wherein the first video signal includes the second video signal and the initial video signal.

In some embodiments of the present application, there are two sub-display screens, and one filled screen; the sharpening filter module 603 is configured to determine a first sub-display screen region which is connected to the filling screen and is within a target range of the sub-display screen, configured to determine a fourth video signal corresponding to the first sub-display screen region in the initial video signal, and configured to perform sharpening filtering on the fourth video signal to obtain a fifth video signal.

In some embodiments of the present application, the driving module 604 is configured to replace the fourth video signal with the fifth video signal, and replacing the second video signal with the third video signal, to obtain the target video signal, and configured to drive the splice screen by the target video signal.

In some embodiments of the present application, there are a plurality of filling screens, and wherein the plurality of filling screens cross and overlap to form at least one intersection region, and wherein the plurality of filling screens intersect to form a plurality of accommodating spaces, and wherein the plurality of sub-display screens are respectively disposed in the plurality of accommodating spaces; and wherein the sharpening filter module 603 is configured to process the initial video signal by linear interpolation to obtain a plurality of second sub-video signals corresponding to the plurality of filling screens, and wherein the sharpening filter module 603 is configured to combine part of the video signals corresponding to the at least one intersection region of the plurality of second sub-video signals to obtain the second video signal corresponding to the filling screen.

In some embodiments of the present application, the sharpening filter module 603 is configured to process the second video signal by using a preset sharpening filter algorithm to obtain the third video signal.

In some embodiments of the present application, the preset sharpening filtering algorithm used by the sharpening filtering module 603 is:

$$g(x,y)=f(x,y)-C*\nabla^2 f(x,y)$$

wherein the g(x,y) is the third video signal, the f(x,y) is the second video signal, the $\nabla^2 f(x,y)$ is a preset Laplace operator, and the C is a preset sharpening filter coefficient.

Figure 7:
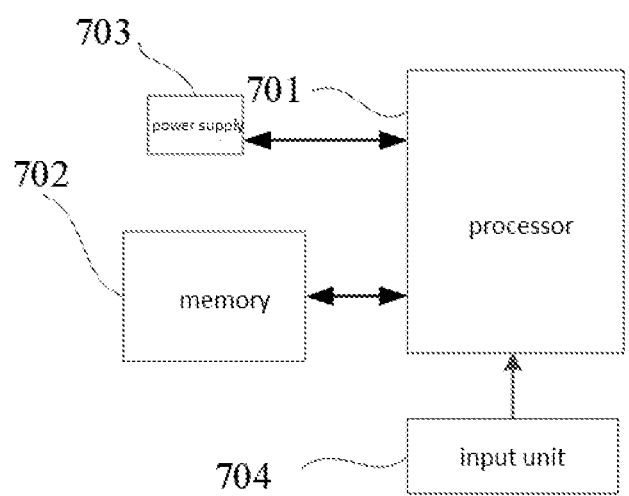
FIG. 7 shows a schematic structural diagram of an electronic device involved in one embodiment of the present application.

The embodiment of the present application also provides an electronic device that integrates any splice screen driving device provided in the embodiment of the present application. As shown in FIG. 7, it shows a schematic structural diagram of an electronic device involved in one embodiment of the present application, specifically:

The electronic device may include one or more processing core processors 701, one or more computer-readable storage medium memory 702, a power supply 703, an input unit 704 and other components. Those skilled in the art can understand that the structure of the electronic device shown in the figure does not constitute a limitation on the electronic device, and may include more or fewer components than those shown in the figure, or a combination of certain components, or different component arrangements.

The processor 701 is a control center of the electronic device. It uses various interfaces and lines to connect the various parts of the entire electronic device, runs or executes the software programs and/or modules stored in the memory 702, and calls data, perform various functions of electronic equipment and process data, to monitor the electronic equipment as a whole. Optionally, the processor 701 may include one or more processing cores. Preferably, the processor 701 may integrate an application processor and a modem processor, wherein the application processor mainly processes with the operating system, user interface, and application programs, etc. The modem processor mainly deals with wireless communication. It can be understood that the foregoing modem processor may not be integrated into the processor 701.

The memory 702 may be configured to store software programs and modules. The processor 701 executes various functional applications and data processing by running the software programs and modules stored in the memory 702. The memory 702 may mainly include a program storage region and a data storage region. The program storage region may store an operating system, an application program required by at least one function (such as a sound playback function, an picture playback function, etc.), etc. Data created by the use of electronic equipment, etc. In addition, the memory 702 may include a high-speed random access memory, and may also include a non-volatile memory, such as at least one magnetic disk storage device, a flash memory device, or other volatile solid-state storage devices. Correspondingly, the memory 702 may further include a memory controller to provide the processor 701 with access to the memory 702.

The electronic device also includes a power supply 703 for supplying power to various components. Preferably, the power supply 703 may be logically connected to the processor 701 through a power management system, so that functions such as management of charging, discharging, and power consumption management can be realized through the power management system. The power supply 703 may also include any components such as one or more DC or AC power supplies, a recharging system, a power failure detection circuit, a power converter or inverter, and a power status indicator.

The electronic device may further include an input unit 704, which can be used to receive input digital or character information and generate keyboard, mouse, joystick, optical or trackball signal input related to user settings and function control.

Although not shown, the electronic device may also include a display unit, etc., which will not be repeated here. Specifically, in this embodiment, the processor 701 in the electronic device will follow the following instructions: loading the executable files corresponding to the processes of one or more application programs into the memory 702, and running the application programs stored in the memory 702 by the processor 701, thereby realizing various functions:

acquiring an initial video signal for driving the splice screen, and adjusting a resolution of the initial video signal according to the at least one filling screen to obtain a first video signal; determining a second video signal corresponding to the at least one filling screen in the first video signal; performing sharpening filtering on the second video signal to obtain a third video signal; and replacing the second video signal with the third video signal to obtain a target video signal, and wherein the target video signal is used to drive the splice screen.

A person of ordinary skill in the art can understand that all or part of the steps in the various methods of the foregoing embodiments can be completed by instructions, or by instructions to control related hardware, and the instructions can be stored in a computer-readable storage medium, and loaded and executed by the processor.

One embodiment of the present application provides a computer-readable storage medium, which may include: read only memory (ROM), random access memory (RAM), magnetic disks, or optical disks, etc. Computer programs are stored thereon, and the computer programs are loaded by the processor to execute the steps in any splice screen driving method provided in the embodiments of the present application. For example, the computer programs can be loaded by the processor to perform the following steps:

acquiring an initial video signal for driving the splice screen, and adjusting a resolution of the initial video signal according to the at least one filling screen to obtain a first video signal; determining a second video signal corresponding to the at least one filling screen in the first video signal; performing sharpening filtering on the second video signal to obtain a third video signal; and replacing the second video signal with the third video signal to obtain a target video signal, and wherein the target video signal is used to drive the splice screen.

In the above-mentioned embodiments, the description of each embodiment has its own focus. For a part that is not described in detail in an embodiment, please refer to the detailed description of other embodiments above, which will not be repeated here.

In specific implementation, each of the above units or structures can be implemented as independent entities or can be combined in any way. For the specific implementation of each of the above units or structures, please refer to the previous method embodiments. It is implemented as the same or several entities. For the specific implementation of the above components or structures, please refer to the previous method embodiments, which will not be repeated here.

The above provides a detailed introduction to the splice screen driving method, device, the splice screen driving device, the electronic device, and the computer-readable medium provided by the embodiments of the present application. Specific examples are used in this article to illustrate the principles and implementation of the present application. The description of the above embodiments is only used to help understand the methods and core ideas of the present application. At the same time, for those skilled in the art, according to the ideas of the present application, there will be changes in the specific implementation and scope of the present application. In summary, the content of this specification should not be understood as a limitation of the present application.

What is claimed is:

1. A splice screen driving method, wherein a splice screen comprises a plurality of sub-display screens and at least one filling screen, and wherein the plurality of sub-display screens are disposed at intervals by the at least one filling screen, and wherein the splice screen driving method comprises:

acquiring an initial video signal for driving the splice screen, and adjusting a resolution of the initial video signal according to the at least one filling screen to obtain a first video signal;

determining a second video signal corresponding to the at least one filling screen in the first video signal;

performing sharpening filtering on the second video signal to obtain a third video signal; and replacing the second video signal with the third video signal to obtain a target video signal, and wherein the target video signal is used to drive the splice screen;

wherein the step of acquiring the initial video signal for driving the splice screen, and adjusting the resolution of the initial video signal according to the at least one filling screen to obtain a first video signal comprises:

acquiring the initial video signal, and adjusting the resolution of the initial video signal by linear interpolation to obtain the second video signal corresponding to the at least one filling screen;

wherein the first video signal comprises the second video signal and the initial video signal;

wherein the step of performing sharpening filtering on the second video signal to obtain the third video signal further comprises:

processing the second video signal by using a preset sharpening filter algorithm to obtain the third video signal; and wherein the preset sharpening filter algorithm is:

$$g(x,y)=f(x,y)-c*\nabla^2 f(x,y)$$

wherein the g(x,y) is the third video signal, the f(x,y) is the second video signal, the $\nabla^2$ f(x,y) is a preset Laplace operator, and the C is a preset sharpening filter coefficient.

2. The splice screen driving method according to claim 1, wherein there are two sub-display screens, one filling screen, and wherein a corresponding size of the filling screen is m*b, and wherein the step of acquiring an initial video signal for driving the splice screen, and adjusting a resolution of the initial video signal according to the at least one filling screen to obtain a first video signal comprises:

acquiring the initial video signal, wherein the resolution corresponding to the initial video signal is 2a*b;

adjusting the resolution of the initial video signal from 2a*b to (2a+m)*b according to the size m*b corresponding to the filling screen;

wherein a resolution corresponding to the second video signal is m*b; wherein the first video signal (2a+m)*b comprises the second video signal m*b and the initial video signal 2a*b.

3. The splice screen driving method according to claim 1, wherein there are two sub-display screens, and one filled screen, and wherein after the step of performing sharpening filtering on the second video signal to obtain a third video signal, the splice screen driving method further comprises:

determining a first sub-display screen region which is connected to the filling screen and is within a target range of the two sub-display screens;

determining a fourth video signal corresponding to the first sub-display screen region in the initial video signal; and performing sharpening filtering on the fourth video signal to obtain a fifth video signal.

4. The splice screen driving method according to claim 3, wherein the step of determining the first sub-display screen region which is connected to the filling screen and is within a target range of the two sub-display screens comprises:

determining a region connected to the filling screen and having a same size as the filling screen according to a size of the filling screen, wherein the region is the first-sub-display screen region.

5. The splice screen driving method according to claim 3, wherein the step of replacing the second video signal with the third video signal to obtain a target video signal, and wherein the target video signal is used to drive the splice screen comprises:

replacing the fourth video signal with the fifth video signal, and replacing the second video signal with the third video signal, to obtain the target video signal;

wherein the target video signal is used to drive the splice screen.

6. The splice screen driving method according to claim 1, wherein there are a plurality of filling screens, and wherein the plurality of filling screens cross and overlap to form at least one intersection region, and wherein the plurality of filling screens intersect to form a plurality of accommodating spaces, and wherein the plurality of sub-display screens are respectively disposed in the plurality of accommodating spaces, and wherein the step of processing the initial video signal by linear interpolation to obtain a second video signal corresponding to the filling screen comprises:

processing the initial video signal by linear interpolation to obtain a plurality of second sub-video signals corresponding to the plurality of filling screens; and combining part of video signals corresponding to the at least one intersection region of the plurality of second sub-video signals to obtain the second video signal corresponding to the filling screen.

7. An electronic device, comprising:

one or a plurality of processors;

a memory; and one or a plurality of application programs, wherein the one or the plurality of application programs are stored in the memory and configured to be executed by the processor to implement the splice screen driving method according to claim 1.

8. A computer-readable storage medium, wherein a computer program is stored thereon, and the computer program is loaded by a processor to execute the steps in the splice screen driving method according to claim 1.

9. A splice screen driving device, wherein a splice screen comprises a plurality of sub-display screens and at least one filling screen, and wherein the plurality of sub-display screens are disposed at intervals by the at least one filling screen, and wherein the splice screen driving device comprises:

an acquiring module configured to acquire an initial video signal for driving the splice screen, and adjust a resolution of the initial video signal according to the at least one filling screen to obtain a first video signal;

a determining module configured to determine a second video signal corresponding to the at least one filling screen in the first video signal;

a sharpening filtering module configured to perform sharpening filtering on the second video signal to obtain a third video signal; and a driving module configured to replace the second video signal with the third video signal to obtain a target video signal, and wherein the target video signal is used to drive the splice screen;

wherein the acquisition module is configured to acquire the initial video signal, and configured to adjust the resolution of the initial video signal by linear interpolation to obtain the second video signal corresponding to the at least one filling screen;

wherein the first video signal comprises the second video signal and the initial video signal;

wherein the sharpening filter module is configured to process the second video signal by using a preset sharpening filter algorithm to obtain the third video signal; and wherein the preset sharpening filter algorithm is:

$$g(x,y)=f(x,y)-C*\nabla^2 f(x,y)$$

wherein the g(x,y) is the third video signal, the f(x,y) is the second video signal, the $\nabla^2$ f(x,y) is a preset Laplace operator, and the C is a preset sharpening filter coefficient.

10. The splice screen driving device according to claim 9, wherein there are two sub-display screens, one filling screen, and wherein a corresponding size of the filling screen is m*b, and wherein the acquisition module is configured to acquire the initial video signal, wherein the resolution corresponding to the initial video signal is 2a*b; and wherein the acquisition module is configured to adjust the resolution of the initial video signal from 2a*b to (2a+m)*b according to the size m*b corresponding to the filling screen; and wherein a resolution corresponding to the second video signal is m*b; wherein the first video signal (2a+m)*b comprises the second video signal m*b and the initial video signal 2a*b.

11. The splice screen driving device according to claim 9, wherein there are two sub-display screens, and one filled screen; the sharpening filter module is configured to determine a first sub-display screen region which is connected to the filling screen and is within a target range of the two sub-display screens, configured to determine a fourth video signal corresponding to the first sub-display screen region in the initial video signal, and configured to perform sharpening filtering on the fourth video signal to obtain a fifth video signal.

12. The splice screen driving device according to claim 11, wherein the sharpening filter module is configured to determine a region connected to the filling screen and having a same size as the filling screen according to a size of the filling screen, wherein the region is the first-sub-display screen region.

13. The splice screen driving device according to claim 11, wherein the driving module is configured to replace the fourth video signal with the fifth video signal, and replacing the second video signal with the third video signal, to obtain the target video signal, and configured to drive the splice screen by the target video signal.

14. The splice screen driving device according to claim 9, wherein there are a plurality of filling screens, and wherein the plurality of filling screens cross and overlap to form at least one intersection region, and wherein the plurality of filling screens intersect to form a plurality of accommodating spaces, and wherein the plurality of sub-display screens are respectively disposed in the plurality of accommodating spaces; and wherein the sharpening filter module is configured to process the initial video signal by linear interpolation to obtain a plurality of second sub-video signals corresponding to the plurality of filling screens, and wherein the sharpening filter module is configured to combine part of video signals corresponding to the at least one intersection region of the plurality of second sub-video signals to obtain the second video signal corresponding to the filling screen.

15. A splice screen driving method, wherein a splice screen comprises a plurality of sub-display screens and at least one filling screen, and wherein the plurality of sub-display screens are disposed at intervals by the at least one filling screen, and wherein the splice screen driving method comprises:

acquiring an initial video signal for driving the splice screen, and adjusting a resolution of the initial video signal according to the at least one filling screen to obtain a first video signal;

determining a second video signal corresponding to the at least one filling screen in the first video signal;

performing sharpening filtering on the second video signal to obtain a third video signal; and replacing the second video signal with the third video signal to obtain a target video signal, and wherein the target video signal is used to drive the splice screen;

wherein the step of acquiring the initial video signal for driving the splice screen, and adjusting the resolution of the initial video signal according to the at least one filling screen to obtain a first video signal comprises:

acquiring the initial video signal, and adjusting the resolution of the initial video signal by linear interpolation to obtain the second video signal corresponding to the at least one filling screen;

wherein the first video signal comprises the second video signal and the initial video signal; and wherein there are two sub-display screens, one filling screen, and wherein a corresponding size of the filling screen is m*b, and wherein the step of acquiring an initial video signal for driving the splice screen, and adjusting a resolution of the initial video signal according to the at least one filling screen to obtain a first video signal comprises:

acquiring the initial video signal, wherein the resolution corresponding to the initial video signal is 2a*b;

adjusting the resolution of the initial video signal from 2a*b to (2a+m)*b according to the size m*b corresponding to the filling screen;

wherein a resolution corresponding to the second video signal is m*b; wherein the first video signal (2a+m)*b comprises the second video signal m*b and the initial video signal 2a*b.

\* \* \* \* \*